(12) United States Patent
Little et al.

(10) Patent No.: US 8,442,263 B2
(45) Date of Patent: May 14, 2013

(54) QUANTIFICATION OF ENERGY LOSS FROM BUILDINGS

(75) Inventors: Stewart Little, Dundee (GB); Alan Little, Dundee (GB)

(73) Assignee: IRT Surveys Ltd, Dundee (GB)

( * ) Notice: Subject to any disclaimer, the term of this patent is extended or adjusted under 35 U.S.C. 154(b) by 255 days.

(21) Appl. No.: 12/746,660

(22) PCT Filed: Dec. 10, 2008

(86) PCT No.: PCT/GB2008/004053
§ 371 (c)(1),
(2), (4) Date: Jul. 20, 2010

(87) PCT Pub. No.: WO2009/074783
PCT Pub. Date: Jun. 18, 2009

(65) Prior Publication Data
US 2010/0296694 A1 Nov. 25, 2010

(30) Foreign Application Priority Data
Dec. 11, 2007 (GB) .................................. 0724165.6

(51) Int. Cl.
*G06K 9/00* (2006.01)
*H05B 6/02* (2006.01)
*G01J 5/00* (2006.01)
*G01K 11/30* (2006.01)

(52) U.S. Cl.
USPC ........... 382/100; 219/600; 374/121; 374/124; 702/134

(58) Field of Classification Search ................. 382/100; 219/112, 124.34, 130.21, 600, 601, 618, 219/628, 635, 85.12, 399, 405, 409, 422; 374/121, 124, 29, 31, 32, 33; 702/28, 40, 702/49, 134
See application file for complete search history.

(56) References Cited

U.S. PATENT DOCUMENTS

| 4,896,281 A | * | 1/1990 | Mack ............................. 702/134 |
| 5,713,666 A | * | 2/1998 | Seelin et al. .................. 374/126 |
| 7,720,635 B2 | * | 5/2010 | Donath et al. ................ 702/182 |

OTHER PUBLICATIONS

"SAP 2005—The Government's Standard Assessment Procedure for Energy Rating of Dwellings"; Published on behalf of DEFRA by BRE, Jun. 2008, pp. 0-157.
"England & Wales: L1 Approved Document"; Online document: http://www.planningportal.gov.uk/wales/professionals/buildingregs/technicalguidance/bcconsfppartl/bcconsfppartlappdoc/.
"Northern Ireland Technical Booklet F1"; Online document: http://www.planningportal.gov.uk/wales/professionals/buildingregs/technicalguidance/bcconsfppartl/bcconsfppartlappdoc/.
"Scotland Technical Handbook 6, Domestic"; Online document: http://www.planningportal.gov.uk/wales/professionals/buildingregs/technicalguidance/bcconsfppartl/bcconsfppartlappdoc/.
"England & Wales: L1A Approved Document"; Online document: http://www.planningportal.gov.uk/wales/professionals/buildingregs/technicalguidance/bcconsfppartl/bcconsfppartlappdoc/.
"England & Wales: L1B Approved Document"; Online document: http://www.planningportal.gov.uk/wales/professionals/buildingregs/technicalguidance/bcconsfppartl/bcconsfppartlappdoc/.

(Continued)

*Primary Examiner* — Abolfazl Tabatabai
(74) *Attorney, Agent, or Firm* — Moore & Van Allen, PLLC; W. Kevin Ransom (57) ABSTRACT

A method for determining heat and/or energy loss from a building using a thermographic image of the building, the image of the building being captured at a pre-determined angle, preferably perpendicular to the building, the method comprising analyzing automatically the image to determine the temperature of areas of the image, determining the real size of the scene associated with the image areas that are above a pre-determined temperature and using this to determine heat and/or energy loss from the building.

18 Claims, 6 Drawing Sheets

OTHER PUBLICATIONS

"England & Wales: L2A Approved Document"; Online document: http://www.planningportal.gov.uk/wales/professionals/buildingregs/technicalguidance/bcconsfppartl/bcconsfppartlap-pdoc/.

"England & Wales: L2B Approved Document"; Online document: http://www.planningportal.gov.uk/wales/professionals/buildingregs/technicalguidance/bcconsfppartl/bcconsfppartlap-pdoc/.

International Search Report for PCT/GB2008/004053, dated Apr. 23, 2009.

* cited by examiner

Area calculation for image size

Horizontal plane width calculation.

x = lens angle on horizontal plane (deg)
c = object distance (m)
d = image width (m)

$x° / 2 = y°$ $\tan y \cdot c = b$ $d = 2b$

Figure 7

Vertical plane height calculation.

z = lens angle on vertical plane (deg)
f = object distance (m)
h = image width (m)

$z° / 2 = w°$ $\tan w \cdot f = g$ $h = 2g$

Horizontal plane width calculation.

x = lens angle on horizontal plane (deg) = 23
c = object distance (m) = 25
d = image width (m)

$x° / 2 = y°$
$23/2 = 11.5$

Tan y . c = b
Tan 11.5 . 35 = 7.12 d = 2b
d = 2 . 7.12
d = 14.24

Figure 8 z = lens angle on vertical plane (deg) = 17
f = object distance (m) = 25
h = image width (m)

$z° / 2 = w°$
$17 / 2 = 8.5$

Tan w . f = g
Tan 8.5 . 35 = 5.23

10.46m h = 2g
h = 2 . 5.23
h = 10.46

Image size at a distance of 35m

Image width (pixel) = 320
Image height (pixel) = 240
Image Area (pixel) = 320 x 240 = 76,800

Image width (m) = 14.24
Image height (m) = 10.46
Image Area (m$^2$) = 14.24 x 10.46 = 148.95

76,800 pixels = 148.95 m$^2$
1 pixel = 0.0019394 m$^2$

Figure 9

QUANTIFICATION OF ENERGY LOSS FROM BUILDINGS

FIELD OF THE INVENTION

The present invention relates to a method, system and software for quantifying energy loss from properties using infrared thermographic techniques.

BACKGROUND OF THE INVENTION

Energy and $CO_2$ usage in the UK is currently calculated using one of four standard energy models: Standard Assessment Procedure 2005 (SAP 2005), Reduced Standard Assessment Procedure (RdSAP), National Home Energy Rating (NHER) and Simplified Building Energy Model (SBEM). These rely on theoretical data produced from building plans and on site observations. Typical data recorded is wall construction, heating system, floor area, building location etc. Output from these models details the estimated energy consumption from the property, associated costs and the $CO_2$ emissions.

SAP 2005 has been used as the basis for checking new dwellings for compliance with building regulations in the United Kingdom requiring the conservation of fuel and power since 6 Apr. 2006 (England & Wales: L1 Approved Document), 1 Nov. 2006 (Northern Ireland Technical Booklet F1) and 1 May 2007 (Scotland Technical Handbook 6, Domestic). New legislation within the UK, the Energy Performance Directive of Buildings Directive (EPBD) and the Home Information Pack (HIPs), states that every UK property should be assessed for energy efficiency and an energy rating derived for each property. This calculation is to be based on the RdSAP assessment model.

A limitation of these known assessment models is that they assume buildings have been built 100% to specification with 100% accuracy. No allowance is made for any building defects where the builder's accuracy has been lacking, such as gaps in insulation or poorly fitting details. Currently, the only way to assess a building for its 'quality' of build is via an Air Leakage/Permeability Test, intrusive/destructive testing via boroscopic evaluation or heat flux tests through the structure. The Air Permeability Test is a constituent of Part L: conservation of Fuel in England and Wales and Part J of the building regulations within Scotland. This test, however, provides a pass/fail certificate and does not show the areas of air loss. This can be overcome by using smoke generators within the property. However, this only lasts a short time and does not highlight areas responsible for the highest air leakage, nor can it highlight areas of missing insulation within the structure.

SUMMARY OF INVENTION

According to the present invention, there is provided a method for determining heat loss from a building, the method comprising: preparing a thermographic image of the building, the image of the building captured at a pre-determined angle, preferably perpendicular to the building; analyzing automatically the image to determine the temperature associated with a plurality of areas of the image, and using the determined temperatures and information on the size of the associated areas to determine the heat and/or energy loss.

By capturing and processing a thermographic image of a building, its heat and/or energy loss and so energy cost can be determined without access to the property and without causing disruption or using invasive testing techniques. This produces far more accurate estimate of the energy consumption of an individual property than the performance of a theoretical design.

The method may involve capturing or recording certain environmental conditions at the time the image is taken, for example.

The image may be captured during the following conditions: wind speed less than 10 m/s; no precipitation for at least 24 hrs before testing; no precipitation during the testing; imaging takes place after sunset to ensure solar gain has dispersed and internal heating within the property is active for at least a minimum period, for example one hour, prior to testing with a known or monitored average internal temperature, for example 21° C.

The method may involve removing areas of the captured image that are not of interest prior to analyzing automatically the image. Removing unwanted regions may involve assigning them a temperature value outside the temperature range of interest for the building that is being investigated. The temperature value may be over 90 C, for example 100 C.

The thermographic image may be displayed, with pre-determined temperatures or temperature ranges being allocated to pre-determined colors. Doing this allows the actual real life heat loss from the building to be shown pictorially.

The method may involve assessing the temperatures associated with the areas of the image; determining a plurality of temperature ranges to cover the temperatures associated with the image of interest, and assigning each temperature range a color. The temperature range recorded in the image may be divided into a predetermined number of colors, for example eight colors, with variation within each color, for example 32 color colour variations. Where eight colors with 32 variations are used, the total number of colors is 256. So there is a gradient of colors for each image.

The method may involve using the size of the image and the real size of the scene that is represented in the image to determine a scale factor for converting the image size to the real scene size, and using the scale factor and the temperatures of areas of the image to determine heat and/or energy loss from the building.

The method may involve determining the real size of an area associated with each pixel of the captured image.

Determining the heat and/or energy loss may involve determining the real size of the areas of the building at a temperature above a pre-determined level.

The method may involve applying an isotherm to the image to determine areas that are above the pre-determined level. The pre-determined level may be an average temperature for the building.

The method may involve assessing temperatures associated with areas of the image and determining a plurality of temperature ranges to cover the temperatures associated with the image of interest.

The method may involve recording from the captured data the temperatures measured. The measured temperatures may be averaged to determine a mean temperature. The mean temperature may be used to determine areas of the image indicative of an above average heat and/or energy loss. A histogram of the temperatures measured may be built.

The method may involve displaying the image in a plurality of colors, wherein pre-determined temperatures or temperature ranges are allocated to pre-determined colors.

Stored or known information on the building may be used to determine the heat and/or energy loss.

The determined heat and/or energy loss is used to calculate the energy cost of the building.

According to another aspect of the present invention, there is provided a system for determining heat loss from a building, the system comprising: means for capturing a thermographic image of the building, the image of the building captured at a pre-determined angle, preferably perpendicular to the building; means for analyzing automatically the image to determine the temperature associated with a plurality of areas of the image, and means for determining the heat and/or energy loss using the determined temperatures and information on the size of the associated areas.

According to yet another aspect of the invention, there is provided a computer program preferably on a data carrier or computer readable medium, for determining heat and/or energy loss from a building using a thermographic image of the building, the image of the building being captured at a pre-determined angle, preferably perpendicular to the building, the computer program having code or instructions for: analyzing automatically the image to determine the temperature of areas of the image; determining the real size of the scene associated with the image areas that are above a pre-determined temperature and using this to determine heat and/or energy loss from the building.

The computer program may have code or instructions for removing areas of the captured image that are not of interest prior to analysing automatically the image. Removing unwanted regions may involve assigning them a temperature value outside the temperature range of interest for the building that is being investigated. The temperature value may be over 90 C, for example 100 C.

The computer program may have code or instructions for displaying the thermographic image, with pre-determined temperatures or temperature ranges being allocated to pre-determined colors.

The computer program may have code or instructions for assessing the temperatures associated with the areas of the image; determining a plurality of temperature ranges to cover the temperatures associated with the image of interest, and assigning each temperature range a color. The temperature range recorded in the image may be divided into a predetermined number of colors, for example eight colors, with variation within each color, for example 32 color variations. Where eight colors with 32 variations are used, the total number of colors is 256. Hence, there is a gradient of colors for each image.

The computer program may have code or instructions for using the size of the image and the real size of the scene that is represented in the image to determine a scale factor for converting the image size to the real scene size, and using the scale factor and the temperatures of areas of the image to determine heat and/or energy loss from the building.

Determining the heat and/or energy loss may involve determining the real size of the areas of the building at a temperature above a pre-determined level.

The computer program may have code or instructions for applying an isotherm to the image to determine areas that are above the pre-determined level. The pre-determined level may be an average temperature for the building.

The computer program may have code or instructions for assessing temperatures associated with areas of the image and determining a plurality of temperature ranges to cover the temperatures associated with the image of interest.

The computer program may have code or instructions for recording from the captured data the temperatures measured. The measured temperatures may be averaged to determine a mean temperature. The mean temperature may be used to determine areas of the image indicative of an above average heat and/or energy loss. A histogram of the temperatures measured may be built.

The computer program may have code or instructions for displaying the image in a plurality of colors, wherein pre-determined temperatures or temperature ranges are allocated to pre-determined colors.

Stored or known information on the building may be used to determine the heat and/or energy loss. The determined heat and/or energy loss is used to calculate the energy cost of the building.

BRIEF DESCRIPTION OF THE DRAWINGS

Various aspects of the invention will now be described by way of example only and with reference to the accompanying drawings, of which.

DETAILED DESCRIPTION OF THE DRAWINGS

The present invention provides a technique for quantifying the amount of energy loss from a building. This is done using property assessments on each individual property of interest. Assessments can be broken down into three distinct areas: theoretical data collection; thermographic data collection and energy assessment via software. Each of these will be described in turn.

Theoretical data collection can be done at various different levels. For the most accurate results, full SAP2005 data is used. Details of this calculation method can be found in "The Government's Standard Assessment Procedure for Energy Rating of Dwellings—2005 edition", the contents of which are incorporated herein by reference. For a lower level of accuracy an RdSAP model can be used, see "The Government's Standard Assessment Procedure for Energy Rating of Dwellings—2005 edition—Appendix S: Reduced Data SAP for existing buildings", the contents of which are incorporated herein by reference. Other proprietary models can be used for the desired level of accuracy. Energy Ratings are determined from The Government's Standard Assessment Procedure for Energy Rating of Dwellings—2005 edition—Appendix S: Reduced Data SAP for existing buildings—Table 15: Rating bands, the contents of which are incorporated herein by reference. This data can be collected via building plans or from a site visit. For commercial buildings the SBEM formulas can also be used on the same basis as the SAP 2005 model. Further details of this model are available from www.ncm.bre.co.uk.

Figure 1:
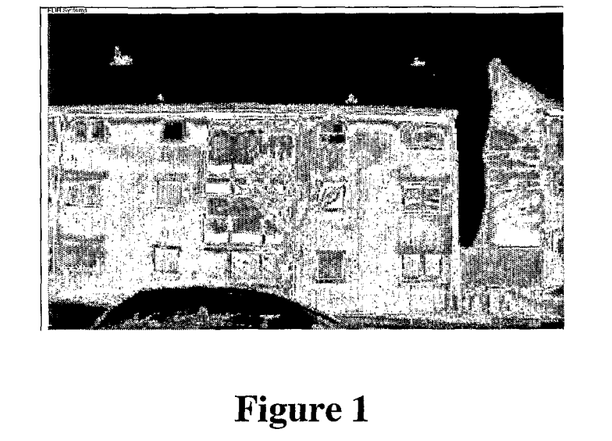
FIG. 1 is a thermographic image of a sample house.

FIG. 1 shows a thermographic image of a sample house. To create this image, infrared thermographic cameras are used to capture infrared radiation emitted from the property. Certain environmental conditions at the time of recording the image have to be known. For example, ideally the image is captured during the following conditions: wind speed less than 10 m/s; no precipitation for at least 24 hrs before testing; no precipitation during the testing; imaging takes place at least 1.5 hours after sunset to ensure solar gain has dispersed and internal heating within the property is active for at least 1 hour prior to testing with an average temperature of 21° C. internally.

Figure 2:
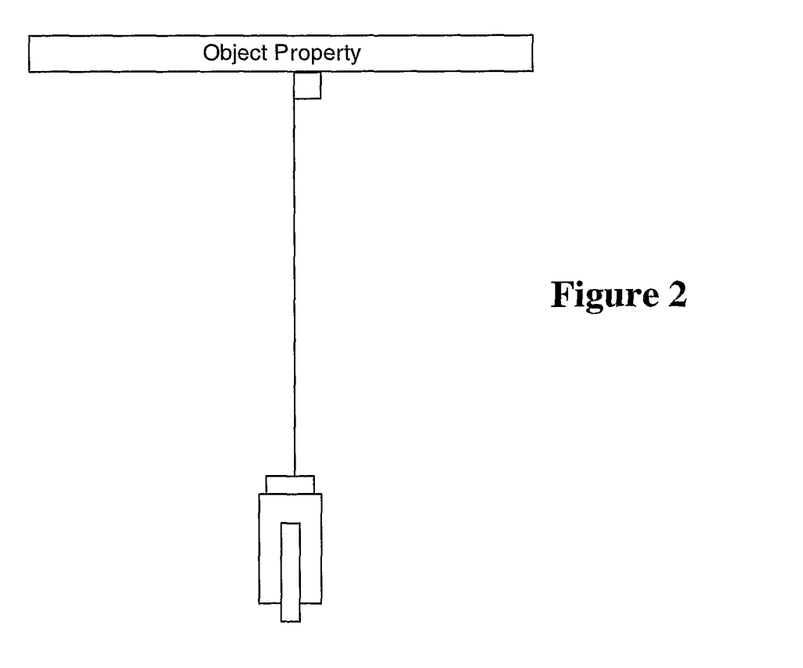
FIG. 2 is a view of a thermographic camera layout for capturing a thermographic image of a building.

Each thermal image is taken adhering to the following specifications: clear line of sight is required to the test subject property; imaging must be taken perpendicular to the subject property, as shown in FIG. 2, and the test elevation should fill the frame of the image as much as possible. Also, at the time of testing, the following measurements have to be taken on site: windspeed; humidity; external temperature; internal temperature; emissivity of test material; distance to object; GPS position and address. The recorded image is saved in an image format, issued a unique file name, tagged with the GPS location data and copied to a PC containing energy calculation software.

The software determines the energy lost in four distinct steps: image preparation; automatic image analysis; building data input and calculation and thermographic energy calculation. In the image preparation phase, data representing each thermographic image is loaded into an image processing software application. Unwanted regions are highlighted and removed manually by the user. Removal of these regions can be done in various ways. One option is to assign unwanted regions a value of 100 C ensuring they are outside any recorded temperature on the building. This effectively removes them from any later calculations. The new manipulated image is then saved. The unwanted regions may include windows, doors, adjacent properties not included in the calculation and any other unwanted regions. This data is then converted to a CSV file (comma separated value) where each temperature on each pixel is assigned a temperature value. This value is already stored in the image calculated by the camera.

Figure 3:
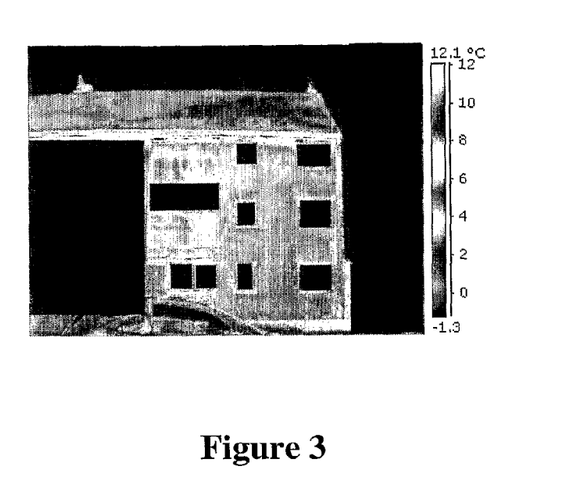
FIG. 3 is the image of FIG. 1 in which some areas that are not of interest are removed.
Figure 4:
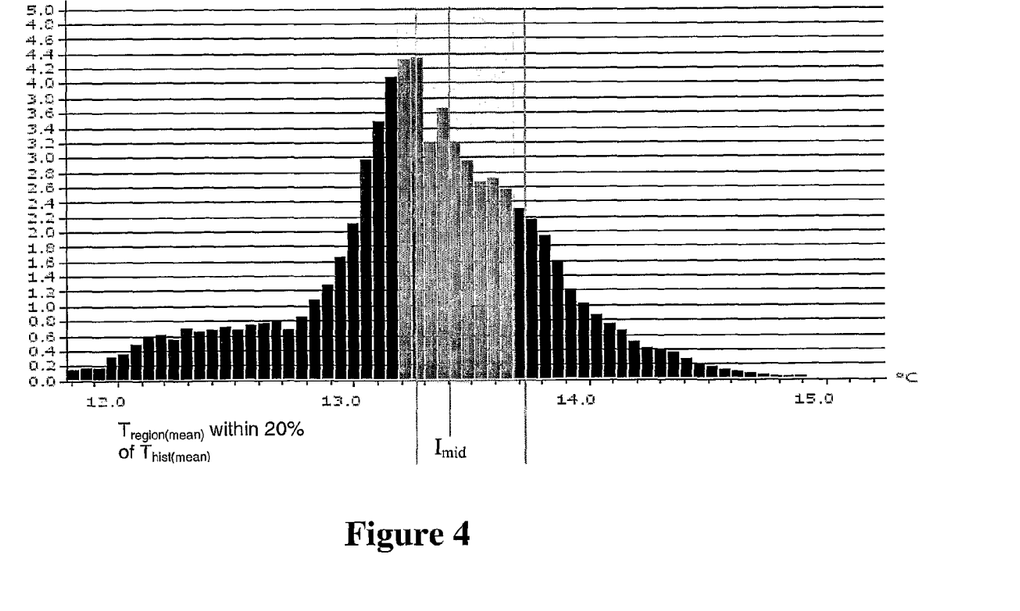
FIG. 4 is a histogram of the image data for the image of FIG. 3.

Once the image is prepared, an automatic image analysis begins. Firstly, a histogram of the temperatures recorded in the CSV file is produced. The software assesses the overall temperature range and assigns each temperature a colour. A typical range within an image would cover approximately 8C. With eight colors this makes each color approximately 1C. This effectively sets the temperature range with the image. A new pictorial version of the CSV file is produced showing the omitted regions in black and the other regions in color, the color depending on their temperature, as shown in FIG. 3. An isotherm is automatically applied to the thermographic image. This is done by creating a histogram made up of 400 points each equivalent to 0.1 deg C. of the thermographic image, as shown in FIG. 4. Then a mean temperature is calculated for the overall histogram, $T_{hist(mean)}$. Mean temperatures are also calculated for regions within a selected temperature range of 10 histogram points, $T_{region(mean)}$.

Figure 5:
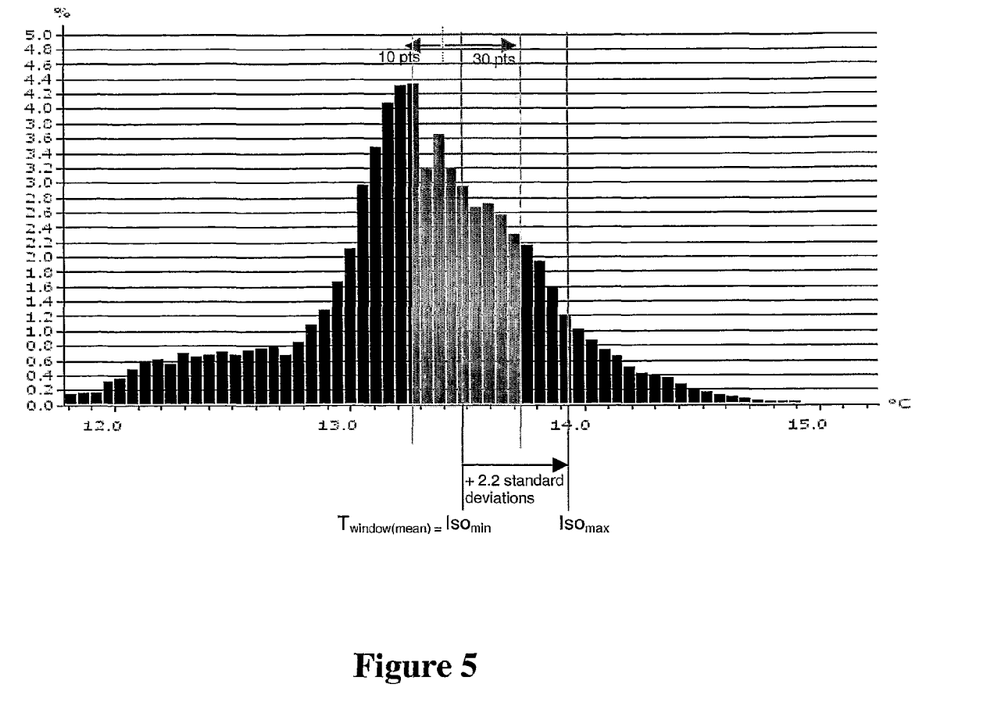
FIG. 5 shows the histogram of FIG. 4 in which minimum and maximum isotherm values are illustrated.
Figure 6:
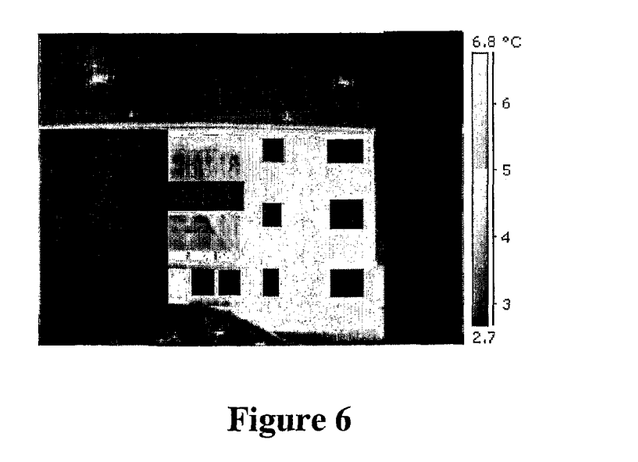
FIG. 6 is the image of FIG. 3 in which after an isotherm of 5 C to 6.8 C is applied.

Working from right to left, every regional mean $T_{region(mean)}$ within 20% of the histogram mean $T_{hist(mean)}$ is selected and becomes the image midpoint of the histogram $I_{mid}$. Shift values are set either side from the $I_{mid}$ value, these being 10 histogram points to the left and 30 histogram points to the right $I_{window}$. The average temperature is now calculated within this range, $T_{window(mean)}$. This is equal to the minimum isotherm value, $Iso_{min}$. Standard deviations of the value, for example, 2.2 are added to the $T_{window(mean)}$ across the entire histogram, as shown in FIG. 5. This becomes the isotherm max point, $Iso_{max}$. Pixels within the max and minimum isotherm temperatures are then artificially colored and counted, and the data recorded and referenced to the specific image file. FIG. 6 shows an image in which an isotherm is applied between 5 and 6.8 C. Only regions within the $Iso_{min}$ and $Iso_{max}$ values are treated as anomalies.

Figure 7:
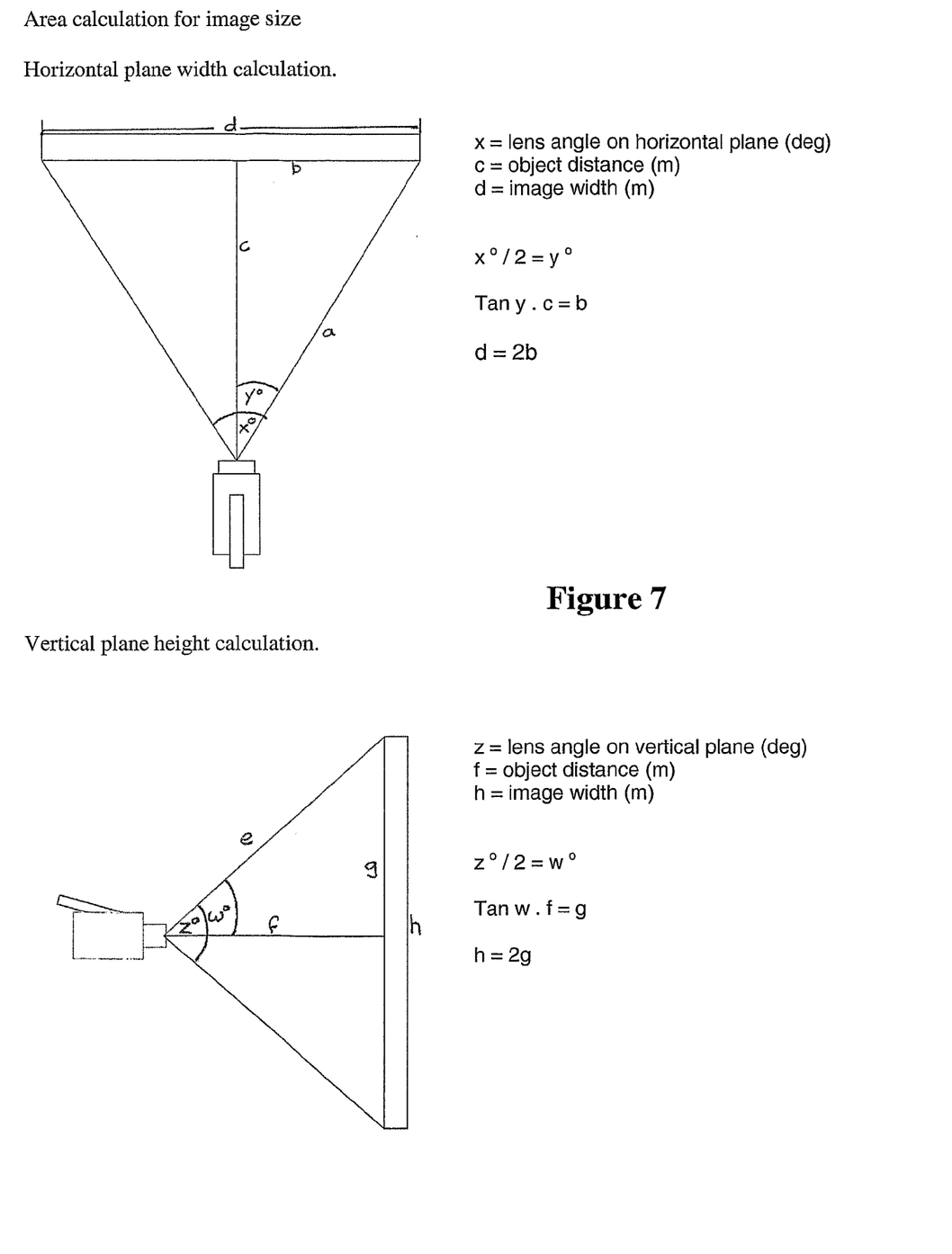
FIG. 7 is an illustration of how the captured image area corresponds to the actual area of the building.

The software then reads data stored in each image relating to settings at the time of imaging. These are the distance to the object, lens used and the resolution of the resulting image. This data, via simple trigonometry, allows the determination of the total image area, which can then be used to determine the area of each pixel within the image. FIG. 7 shows how the image area can be determined. Each distinct anomalous temperature range pixel count is then multiplied by its area to give the overall area of each anomalous region in $m^2$.

Data recorded on the building that is being investigated is entered into the software at the required level of detail, for example full SAP2005 data or RdSAP. On completion of this data input the software outputs the estimated energy use, costs and $CO_2$ emissions per year for the property. Based on the temperature range within the anomalous temperatures on the thermal image a theoretical increase in the actual u-value can be determined. This new u-value is then substituted into the data for the energy calculation producing the new energy use, costs and $CO_2$ emissions per year for the property with the increased u-value in the walls. This process is repeated for each of the anomalous temperature ranges giving energy, cost and $CO_2$ emissions for the property with these new wall u-values. These new costs are then individually divided by the total wall surface area of the property giving an energy use and cost based on energy prices inputted by the user. The $CO_2$ emissions are then calculated on this energy use per $m^2$ per year multiplied by the $CO_2$ emissions factor.

For thermographic energy calculation each distinct anomalous area determined is multiplied by its corresponding cost. The total area of these anomalous regions is totaled and subtracted from the total wall area of the property. The energy use, costs and $CO_2$ emissions from this resulting wall area is then recalculated. This data is tagged onto the jpeg image. The total "poor" wall area can be subtracted from the total "as per plan" wall area giving 2 wall areas of differing construction, i.e. total wall area 100 $m^2$, identified poor wall area 10 $m^2$, 100 m-10 m=90 m, 90 $m^2$ "as per plan" wall area. This can be calculated for each distinct temperature area as determined above. This new area data can be entered into the SAP calculation as a separate wall area and a new SAP rating calculated. This new SAP rating can then be compared with SAP 2005 calculations and an energy rating determined between A to G. It can also be used to determine the expected energy usage for the property. The image is then automatically exported to an excel spreadsheet where the energy data is extracted along with the GPS location and shown in the adjacent cells.

As a specific example, consider the three storey town house of FIGS. 1, 3 and 6. Assume this is in Aberdeen and uses mains gas at a fuel cost of 4.14 p and has the following features:

| Wall Construction: - Filled Brick Cavity SAP Calculation Space Heating Cost per year = £256 (see SAP Calc 1 Worksheet) | |
|---|---|
| Wall area = | 201.54 $m^2$ |
| U-Value = | 0.37 |

-continued

| | |
|---|---|
| Cost per m² = | 256/201.54 = £1.27 |
| Missing insulation - Unfilled Brick Cavity | |
| SAP Calculation Space Heating Cost per year = £584 | |
| (see SAP Calc 2 Worksheet) | |
| Wall area = | 201.54 m² |
| U-Value = | 1.64 |
| Cost per m² = | 584/201.54 = £2.90 |

Difference in cost between a well insulated wall and a wall with no insulation
Cost difference per m² = £1.63

Figure 8:
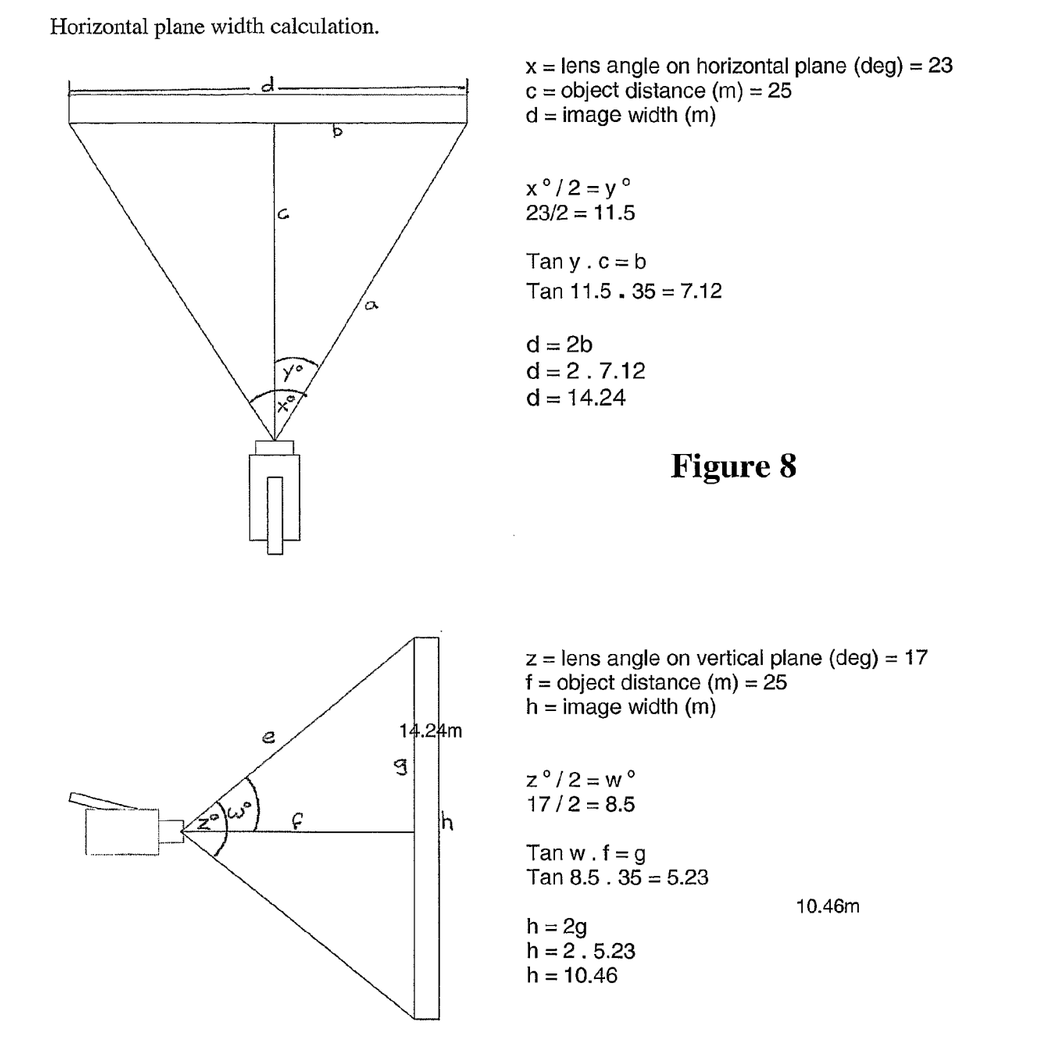
FIG. 8 is an illustration of how the captured image area corresponds to the actual area of the building for a specific example.
Figure 9:
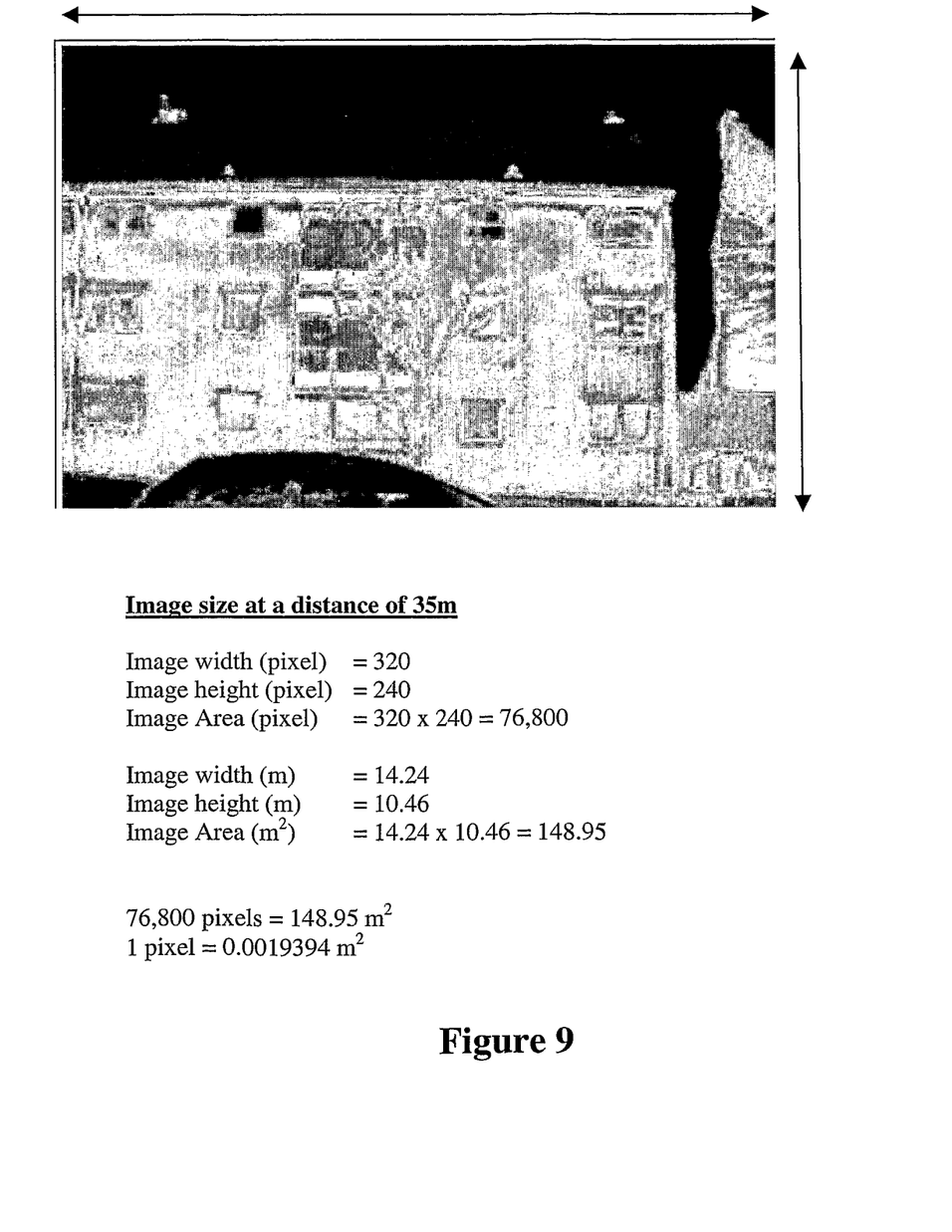
FIG. 9 is an actual, processed image for the example of FIG. 8.

Anomalous Temperature Pixel Count=5548
Distance to object=35 m
Lens used=23°
FIG. 8 shows the dimensions for the building and how the image area is calculated. Further image information is shown in FIG. 9. Using this, the following can be deduced:
Pixel Area=0.0019394 m²
Equivalent Total Area=10.76 m²
Additional Energy=423.7 kWh per year if the highlighted regions had 0% insulation present with a u-value of 1.64.
423.7 kWh at £0.0414=£17.54
Additional Cost=£17.54 per year if these highlighted regions had 0% insulation present with a u-value of 1.64.

The invention provides a simple and effective technique for determining the heat and/or energy loss of a building, as well as its energy cost, without requiring access to the property and without causing disruption or using invasive testing techniques. It also produces more accurate estimates of the energy consumption of an individual property rather than the performance of a theoretical design.

A skilled person will appreciate that variations of the disclosed arrangements are possible without departing from the invention. Accordingly, the above description of a specific embodiment is made by way of example only and not for the purposes of limitations. It will be clear to the skilled person that minor modifications may be made without significant changes to the operation described.

The invention claimed is:

1. A method for determining heat or energy loss from a building using a thermographic image of the building, the image of the building being captured at a pre-determined angle, preferably perpendicular to the building, the method comprising:
  analyzing automatically the image to determine the temperature of areas of the image;
  determining the image areas that are at a temperature above a predetermined temperature, wherein the predetermined temperature is an average temperature for the building, determining the real size of the scene associated with the image areas that are above the average temperature for the building and using this to determine heat or energy loss from the building.

2. A method as claimed in claim 1 comprising using the size of the image and the real size of the scene that is represented in the image to determine a scale factor for converting the image size to the real scene size, and using the scale factor and the temperatures of areas of the image to determine heat or energy loss from the building.

3. A method as claimed in claim 1 comprising determining the real size of an area associated with each pixel of the captured image.

4. A method as claimed in claim 1 comprising applying an isotherm to the image to determine areas that are above the pre-determined level.

5. A method as claimed in claim 1 comprising removing areas of the captured image prior to analyzing automatically the image.

6. A method as claimed in claim 5 comprising assigning to the areas that have to remove temperature value out with the temperature range of interest for the building that is being investigated.

7. A method as claimed in claim 6 wherein the temperature value is over 50 C, preferably over 90 C, for example 100 C.

8. A method as claimed in claim 1 comprising assessing temperatures associated with areas of the image and determining a plurality of temperature ranges to cover the temperatures associated with the image of interest.

9. A method as claimed in claim 1 comprising recording from the captured data the temperatures measured.

10. A method as claimed in claim 9 comprising building a histogram of the temperatures measured.

11. A method as claimed in claim 9 comprising averaging the measured temperatures to determine a mean temperature.

12. A method as claimed in claim 11 comprising using the mean temperature to determine areas of the image indicative of an above average heat or energy loss.

13. A method as claimed in claim 1 comprising displaying the image in a plurality of colors, wherein pre-determined temperatures or temperature ranges are allocated to pre-determined colors.

14. A method as claimed in claim 1 using information on the building to determine the heat or energy loss.

15. A method as claimed in claim 1 comprising using the determined heat or energy loss to calculate the energy cost of the building.

16. A system, preferably computer based or implemented, for determining heat loss from a building, the system comprising:
  means for capturing a thermographis image of the building, the image of the building captured at a pre-determined angle, preferably perpendicular to the building;
  means for analyzing automatically the image to determine the real size of the scene associated with the images areas that are above a predetermined temperature and using this to determine heat or energy loss from the building, wherein the predetermined temperature is an average temperature for the building; and
  means for determining the heat or energy loss using the determined temperatures and information on the size of the associated areas.

17. A computer program preferably on a non-transitory computer readable medium, for determining heat or energy loss from a building using a thermographic image of the building, the image of the building being captured at a pre-determined angle, preferably perpendicular to the building, the computer program having computer program instructions for: analyzing automatically the image to determine the temperature of areas of the image; determining the real size of the scene associated with the image areas that are above a pre-determined temperature and using this to determine heat or energy loss from the building, wherein the predetermined temperature is an average temperature.

18. A computer program preferably on a non-transitory computer readable medium for determining heat or energy loss from a building using a thermographic image of the building, the image of the building being captured at a pre-determined angle, preferably perpendicular to the building, the computer program comprising:
  computer program instructions for analyzing automatically the image to determine the temperature of areas of the image; and computer program instructions for determining the image areas that are at a temperature above a predetermined temperature, wherein the predetermined temperature is an average temperature for the building, determining the real size of the scene associated with the image areas that are above the average temperature for the building and using this to determine heat or energy loss from the building.

* * * * *